Sept. 15, 1964    F. GIOVANNETTI    3,148,579
SHEET METAL EXPANSION ANCHOR ADAPTED TO CLAMP THE
SCREW UPON INSERTION THEREOF
Filed May 1, 1961
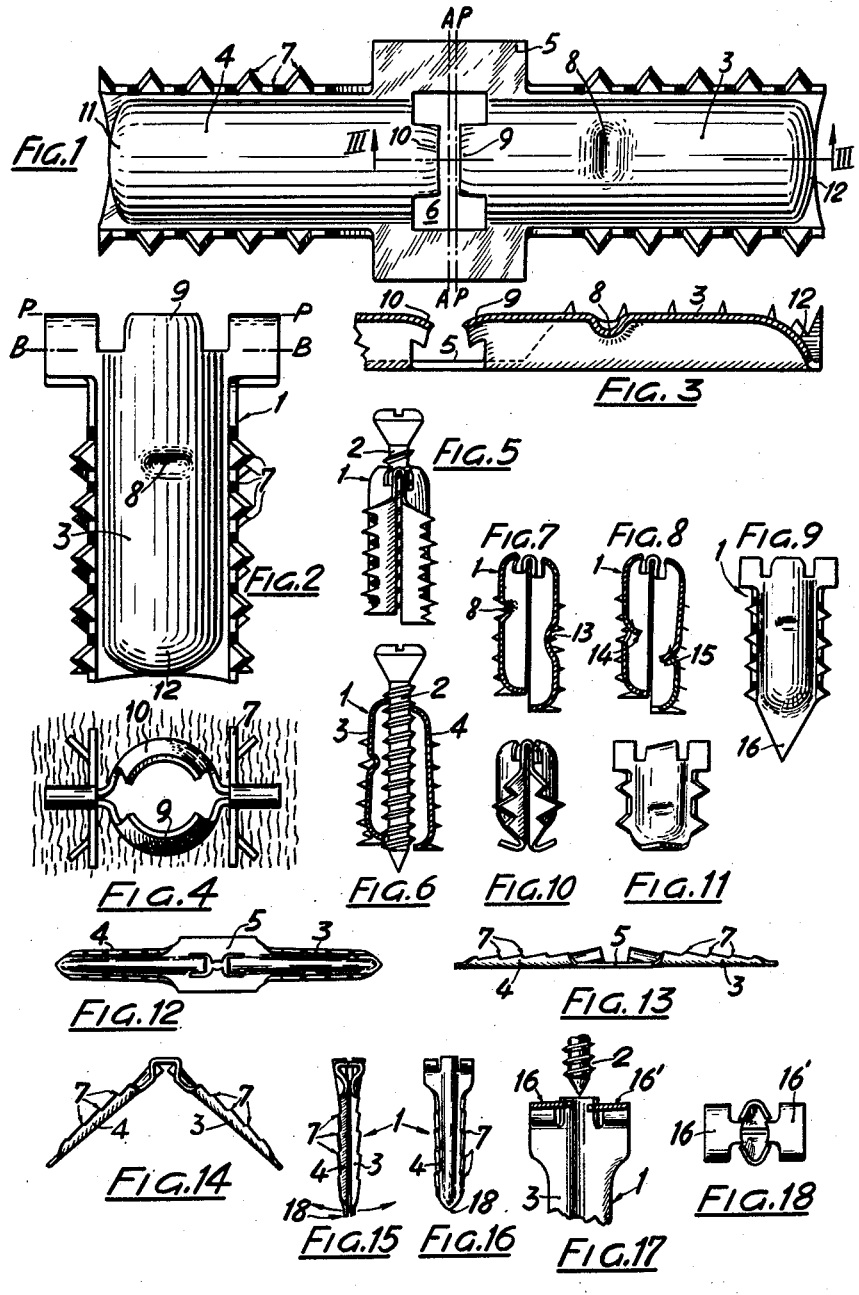
INVENTOR
FIORELLO GIOVANNETTI
ATTORNEY

United States Patent Office 3,148,579
Patented Sept. 15, 1964

3,148,579
SHEET METAL EXPANSION ANCHOR ADAPTED TO CLAMP THE SCREW UPON INSERTION THEREOF
Fiorello Giovannetti, Via Marciano 4, Milan, Italy
Filed May 1, 1961, Ser. No. 106,795
Claims priority, application Italy, May 4, 1960, 628,021
2 Claims. (Cl. 85—83)

This invention relates to a fastening device which is suitable for providing good grip or hold in any kind of material.

The fastening device, subject of this invention, comprises a body provided with means for gripping and serving as a housing for a screw; a screw, suitable for being screwed into said body, expanding it in a predetermined direction when screwed all the way into the body; the body being designed to have such a shape as will always exercise a good grip or clamping effect on the screw, both when not expanded and when in the expanded condition.

Further objects, characteristics and advantages of this invention will be apparent from the accompanying detailed description illustrating the invention in several preferred forms of embodiment, to be treated as illustrative of the invention and not restrictive, reference being made to the accompanying drawings, in which:

FIG. 1 shows one step in the process of manufacture to produce the body of a device as in the present invention, particularly suitable for wood conglomerates and other wood products.

FIG. 2 is the finished body.

FIG. 3 is an axial cross-section taken along plane III—III of FIG. 1, looking in the direction shown by the arrows.

FIG. 4 is a plan view of FIG. 2 seen from above.

FIG. 5 is a schematic drawing of a fastening or fixing device embodying the invention.

FIG. 6 is a schematic sectional drawing of the device shown in FIG. 5 during the expanded or fixing condition of the device.

FIG. 7 is a modified body which can be used in place of the one shown in FIG. 5.

FIG. 8 is another, different modified body.

FIG. 9 is another different modified body.

FIG. 10 is a schematic drawing of a body for fastening devices suitable for use with minimum wood thicknesses.

FIG. 11 is a front view of the body shown in FIG. 10.

FIG. 12 is a small scale drawing of a fastening device similar to the one shown in FIG. 5, to produce a fastener body for a device embodying the invention such as will be particularly suitable for use in brickwork or masonry walls.

FIG. 13 is a side view of FIG. 12.

FIG. 14 is a similar view to that shown in FIG. 13, at a later processing step.

FIG. 15 shows the fastener body of FIGS. 12 through 14 when finished.

FIG. 16 shows a front view of the fastener body shown in FIG. 15.

FIG. 17 is an enlarged detail of the fastening device for use in brickwork or masonry walls showing separate components.

FIG. 18 is a plan view from above of the fastener body shown in FIG. 17.

The same reference numbers are used in the various figures to indicate similar or corresponding parts.

The fastening device shown in FIG. 5 comprises a fastener body 1, into which a screw 2 is partially screwed.

The fastener body 1 is composed of two parts or legs 3 and 4, shaped to form a seat for screw 2 and having means for gripping or holding to the material supporting the fastener. The body also has means for gripping and guiding the screw, as will be apparent from the further description.

This fastener body 1 can be produced in the manner shown in the series of drawings, FIGS. 1 through 4. A piece of sheet metal is stamped to give an area 5 at its middle, provided with a central, I-shaped opening 6 and two side arms 3 and 4 having lengths slightly differing from one another. These arms have their side edges 7 in saw-tooth form, the teeth being staggered so that they alternately bind in opposite directions. Afterwards the piece is drawn as shown in FIG. 1 and given a guide notch 8 for the screw. Then the piece is bent about a transverse line P—P which is slightly offset from the central transverse axis A—A of the piece, so that the sides 9 and 10 of the I-opening will be at slightly different heights in respect to one another, each serving as a seat for one thread of the screw 2. The lower ends 11 and 12 of legs 3 and 4 of the piece are also at heights slightly offset from one another to form a seat for one of the threads of screw 2.

A screw, as shown in FIG. 5, is partially screwed into the fastener body 1, being guided during its travel by the notch or finger 8 protruding towards the inside.

In order to fix or fasten this device, a hole is first made in the wood conglomerate or other material serving as a support for same. The fastener body 1 is then placed inside the hole and, lastly, screw 2 is screwed down all the way. When screw 2 reaches bottom seats 11, 12, it will start to take hold, biting into the fastener body 1 and causing it to expand, which latter, due to its saw teeth 7 will, in turn, bite into and grip the supporting material. It should be noted that the expansion of the fastener body 1 occurs in a direction or plane at right angles to the axis of the fastener passing between the two arms 3 and 4 and that the two arms 3 and 4 are spread apart, rotating about a pivoting axis B—B. Since said axis B—B in the embodiment herein shown is slightly below the opening for the screw 9, 10 of fastener body 1, the two ends which go to make up said screw opening will clamp down heavily on the screw when legs 3, 4 of fastener body 1 are spread apart, causing screw 2 to be strongly and firmly coupled to fastener body 1, so that the screw cannot come loose and fall out. In turn, the fastener body 1 will exercise a good grip in the supporting material and since the expansion takes place in a predetermined direction, there is no danger that breakage may occur in wood or other similar supporting material having considerable strength in one direction and very little in the other.

If a metal strip, strap or other similar part is placed between the head of screw 2 and fastener body 1, it will be strongly held against the supporting material. Or the head of the screw can be shaped like a hook or other similar part which will be strongly united to the supporting material.

The amount of the expansion of legs 3, 4 can be varied at will according to the type of supporting material in which the fastening device is anchored by varying the diameter of screw 2 or the length of the fastener body 1.

If the length of fastener body 1 will not allow screw 2 to pass all the way through the end of it when the screw has been screwed in all the way, the fastener body 1 can be made to expand by supplying it with an internal prominence 13 on at least one of the two legs of the fastener body, as shown in FIG. 7.

If the hardness of the fastener body should be considerable, the embodiment shown in FIG. 8 will prove advantageous, namely, small fins 14, 15 serving as guides and acting as seats for the threads of the screw are stamped in the body 1 protruding towards the inside of the body and slightly offset from one another in a longitudinal direction taken along the length of the fastener body 1. Shifting the position at which the screw bites into the fastener body in this manner from the lower end towards the center of the body helps to compensate for the lesser expansion of the fastener body itself and gives additional grip to the screw.

Finally, the embodiment shown in FIG. 9 has a fastener body with the legs ending in a point 16 which can be driven into the supporting material without having to first make a hole in said material.

The embodiment shown in FIGS. 10 and 11 is particularly advantageous for thinner supporting material whether of wood or of other material. In fact, in such a case the grip given by the side edges 7 having saw-tooth shape would be too little and therefore there are provided small fins or gripping teeth 7' outstanding from the free ends of the arms to give additional gripping power.

The embodiment shown in FIGS. 12 through 18, provided for fastening devices of the expanding type which are particularly advantageous for fixing in brickwork or masonry-type walls or similar material, and similar to the devices herein previously described, differ from the latter only in the fact that the mid-portion 5 between the arms 3 and 4 is provided with small fins 16, 16' having the purpose of giving a certain amount of elasticity to the fastening body to prevent it, upon expanding, from cracking the wall. Furthermore, in this type of embodiment, these same elastic fins 16, 16' comprise, by means of their inside edges, a seat for expansion screw 2, said edges being slightly offset from one another as to their height.

The top portion of the fastener body is slightly tapered, further tapering towards the bottom to form a narrower portion 17 which grips the screw. Below this point the fastener body comes to a point at 18 for its insertion in a wall in which no preparatory hole has been drilled and the saw teeth 7 of the side edges are shorter in length so they will not interfere with the insertion of the fastener body, and are asymmetrical to make insertion of the body easier. This form further prevents the fastener body from being removed.

In order to fasten or fix the device shown in FIGS. 12 through 18 to brickwork or masonry walls, the fastener body 1 is first inserted with legs 3 and 4 brought together. The expansion screw 2 is then screwed in all the way, which makes the legs 3 and 4 tend to separate from one another and move apart, biting into the wall. The elastic fins 16, 16' prevent any excessive expansion or separation of the legs 3 and 4, guaranteeing excellent grip of the device to the wall.

The drawing of the arms, which, in the embodiments shown in FIGS. 1 through 11, serves mostly to guide screw 2, has, in the embodiments shown in FIGS. 12 through 18 primarily the function of providing longitudinal reinforcement to prevent the fastener body from binding or being deformed when inserted in the wall by driving it in with a hammer, or other tool. A tool which can be held firmly in the hand and provided with a base having two pieces acting as a guide for the fastener body while a punch, striking against the head of the fastener body, and equipped with a head protruding from the tool, proves particularly advantageous for insertion of the fastener body in the wall. Thus the fastener body can be inserted straight at right angles with the wall.

It is obvious that various modifications and variants can be made to the invention described herein to meet practical requirements on the part of experts in this field, without, however falling outside the scope and coverage of the invention, itself, which takes in a much wider field.

What I claim is:

1. An expansion fastener for screws, comprising, a one-piece length of sheet metal having an enlarged central portion and first and second arms extending in side-by-side parallelism from respectively opposite edges of said portion, said arms being arcuate in transverse section to conjointly define a tubular passageway for a screw, said passageway having a central longitudinal axis, the side edges of said arms being flanged outwardly substantially radially of said axis and having penetrating points spaced uniformly therealong, the distal ends of said arms converging together to form points of contact with a screw, for separating said arms, there being an I-shaped opening in said portion, centrally thereof, with its axis of symmetry normal to said longitudinal axis, said portion being folded along a line offset from and parallel with said axis of symmetry to position in longitudinally offset relation, corresponding contiguous penetrating points of the respective arms, said opening defining a pair of oppositely-disposed, spaced, upstanding lugs extending from the ends of said arms and converging at their top ends to form screw-engaging points, the diameter of said tubular passageway being substantially greater than the distance between said lugs and said distal ends, said arms expanding about a transverse axis below and adjacent said points, in response to passage of a screw between the distal ends of said arms, whereby said screw-engaging points of said lugs are urged together.

2. The fastener of claim 1, at least one said arm having an indentation between its ends for engaging the threads of a screw during its turning in and along said passageway.

References Cited in the file of this patent

UNITED STATES PATENTS

| 962,306 | Bryant | June 21, 1910 |
| 1,596,044 | Johnson | Aug. 17, 1926 |
| 2,720,135 | Gisondi | Oct. 11, 1955 |

FOREIGN PATENTS

| 500,585 | Germany | June 23, 1930 |